(12) United States Patent
Yamamoto et al.

(10) Patent No.: US 10,363,868 B2
(45) Date of Patent: Jul. 30, 2019

(54) VEHICLE APPROACH NOTIFICATION DEVICE

(71) Applicant: ANDEN CO., LTD., Anjo, Aichi-pref. (JP)

(72) Inventors: Chikara Yamamoto, Anjo (JP); Kazushi Yokota, Anjo (JP)

(73) Assignee: ANDEN CO., LTD., Anjo, Aichi-pref. (JP)

( * ) Notice: Subject to any disclaimer, the term of this patent is extended or adjusted under 35 U.S.C. 154(b) by 0 days.

(21) Appl. No.: 16/060,992

(22) PCT Filed: Nov. 22, 2016

(86) PCT No.: PCT/JP2016/084543
§ 371 (c)(1),
(2) Date: Jun. 11, 2018

(87) PCT Pub. No.: WO2017/104358
PCT Pub. Date: Jun. 22, 2017

(65) Prior Publication Data
US 2018/0334096 A1 Nov. 22, 2018

(30) Foreign Application Priority Data

Dec. 14, 2015 (JP) .................................. 2015-243494

(51) Int. Cl.
*B60Q 5/00* (2006.01)
*H04R 3/00* (2006.01)
(Continued)

(52) U.S. Cl.
CPC ............... *B60Q 5/005* (2013.01); *B60Q 5/00* (2013.01); *B60R 16/023* (2013.01); *H04R 3/00* (2013.01);
(Continued)

(58) Field of Classification Search
CPC ....... H04R 2499/13; G10K 2210/1282; H03G 3/20; H03G 3/34
(Continued)

(56) References Cited

U.S. PATENT DOCUMENTS 4,414,514 A * 11/1983 Seki ........................ H03F 1/526
330/207 P
9,224,294 B1 * 12/2015 St. John ............... G08G 1/0965
(Continued)

FOREIGN PATENT DOCUMENTS

JP 2013028232 A 2/2013
JP 2013244792 A 12/2013

*Primary Examiner* — Alexander Jamal
(74) *Attorney, Agent, or Firm* — Harness, Dickey & Pierce, P.L.C.

(57) ABSTRACT

A vehicle approach notification device includes a speaker disposed between push-pull circuits. The push-pull circuits amplify power of a notification sound signal by their push-pull outputs, and output the amplified notification sound signal to the speaker so that the speaker emits a notification sound for notification of an approach of a vehicle. When the push-pull outputs of the push-pull circuits are stopped, and the microcomputer outputs a high-level signal between a common connection terminal and ground, the microcomputer determines that there is a wire-discontinuity failure in the speaker when a voltage between common connection terminals is equal to or higher than a predetermined value.

3 Claims, 4 Drawing Sheets

(51) Int. Cl.
  *B60R 16/023* (2006.01)
  *H04R 3/04* (2006.01)
  *H04R 29/00* (2006.01)

(52) U.S. Cl.
  CPC ............. *H04R 3/04* (2013.01); *H04R 29/003* (2013.01); *H04R 2400/00* (2013.01); *H04R 2499/13* (2013.01)

(58) Field of Classification Search
  USPC .......................................... 381/86; 330/262
  See application file for complete search history.

(56) References Cited

U.S. PATENT DOCUMENTS

| | | |
|---|---|---|
| 2013/0314251 A1 | 11/2013 | Tsuzuki |
| 2014/0300455 A1 | 10/2014 | Tsuzuki et al. |

\* cited by examiner

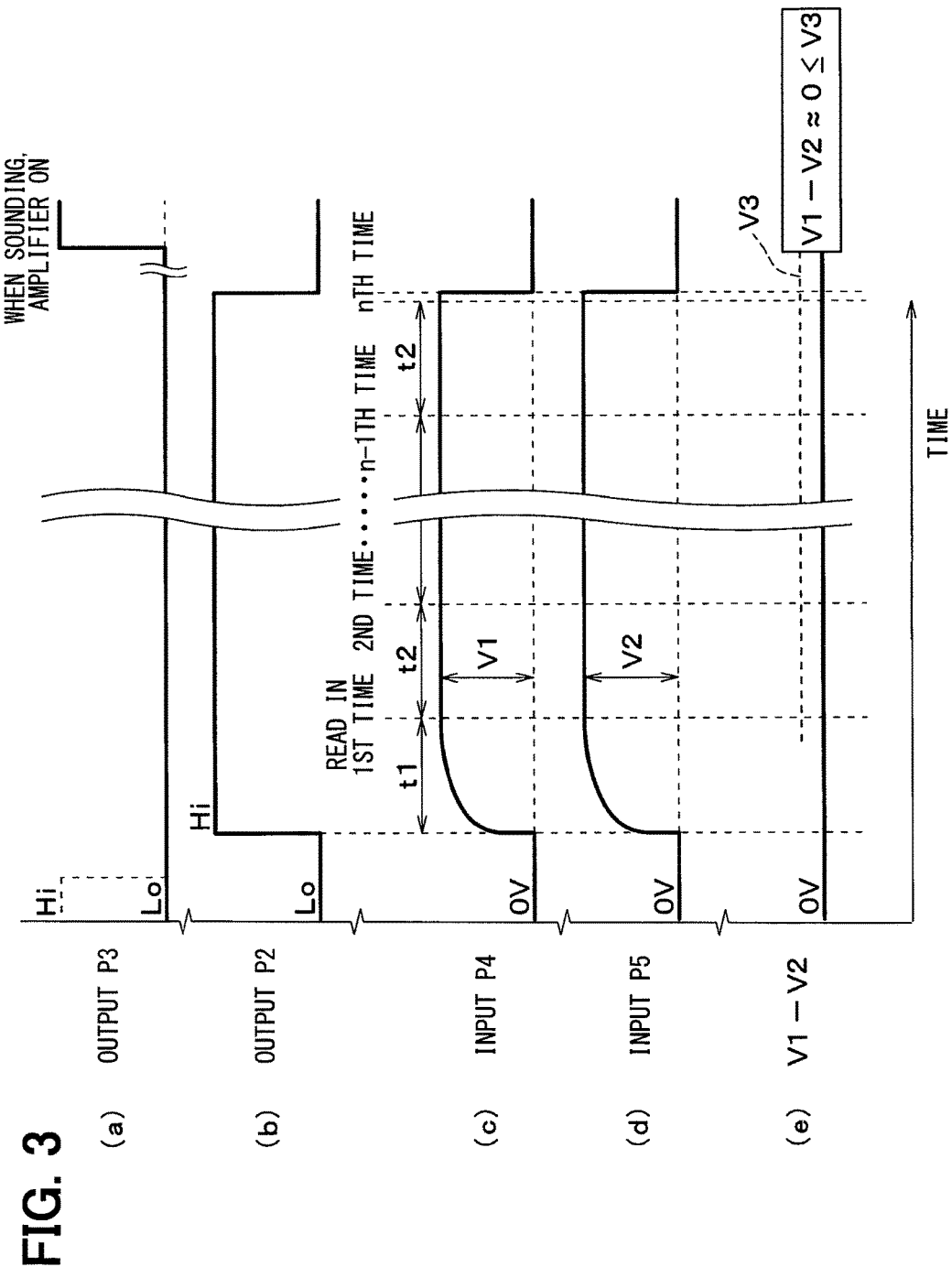

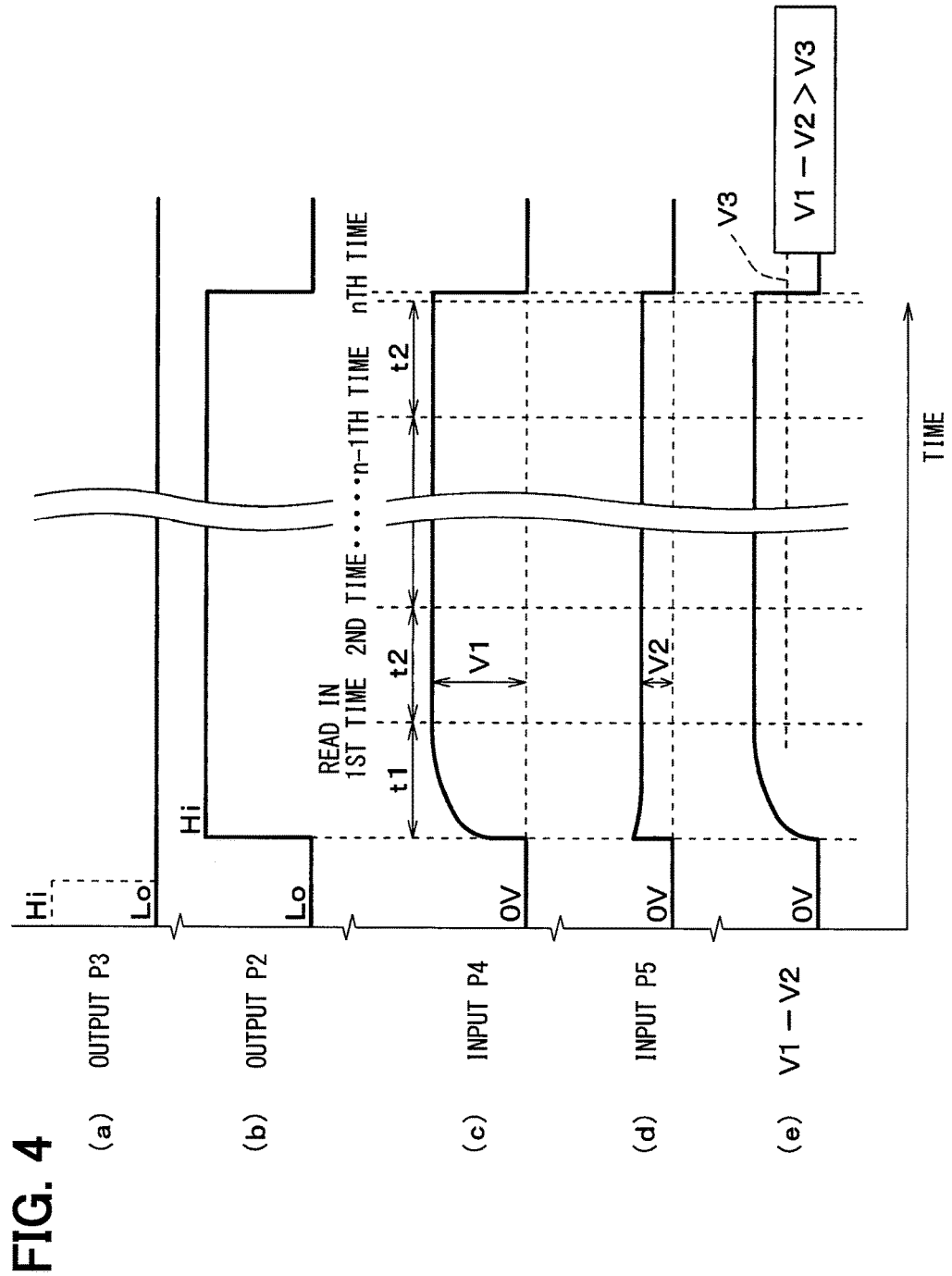

VEHICLE APPROACH NOTIFICATION DEVICE

CROSS REFERENCE TO RELATED APPLICATIONS

This application is a U.S. National Phase Application under 35 U.S.C. 371 of International Application No. PCT/JP2016/084543 filed on Nov. 22, 2016 and published in Japanese as WO 2017/104358 A1 on Jun. 22, 2017. This application is based on and claims the benefit of priority from Japanese Patent Application No. 2015-243494 filed on Dec. 14, 2015. The entire disclosures of all of the above applications are incorporated herein by reference.

TECHNICAL FIELD

The present disclosure relates to a vehicle approach notification device that causes a sounding body to emit a notification sound for notification of an approach of a vehicle.

BACKGROUND ART

Conventionally, there has been proposed a vehicle approach notification device that includes an amplifier that amplifies power of a notification sound signal output from a microcomputer and outputs the amplified signal outputted from the amplifier to a speaker so that the speaker emits a notification sound (e.g., refer to Patent Literature 1 and Patent Literature 2).

The amplifier is a power amplifier circuit having a SEPP circuit configuration. SEPP stands for single ended push-pull. The microcomputer monitors the amplified signal output from the amplifier to the speaker and detects a wire-discontinuity failure of the speaker on the basis of a result of the monitoring.

PRIOR ART LITERATURE

Patent Literature

Patent Literature 1: JP 2013-28232 A
Patent Literature 2: JP 2013-244792 A

SUMMARY

The inventors of the present invention have conducted a study regarding a configuration that detects a wire-discontinuity failure of a speaker in a vehicle approach notification device that uses an amplifier of bridge-tied load (BTL) circuit configuration capable of coping with a higher volume of sound than the amplifier of SEPP circuit configuration of Patent Literatures 1, 2 described above.

In view of the above point, it is an object of the present disclosure to detect a wire-discontinuity failure of a sounding body corresponding to a speaker in a vehicle approach notification device provided with a BTL circuit amplifier that includes the sounding body disposed between two push-pull circuits.

According to an aspect of the present disclosure, a vehicle approach notification device includes a first push-pull circuit configured to perform a push-pull output based on a notification sound signal, a phase inversion circuit configured to invert the phase of the notification sound signal, and a second push-pull circuit configured to perform a push-pull output based on the notification sound signal whose phase has been inverted by the phase inversion circuit. The first push-pull circuit and the second push-pull circuit constitute a BTL circuit amplifier that includes a sounding body disposed between the first push-pull circuit and the second push-pull circuit. The first push-pull circuit and the second push-pull circuit are configured to amplify a power of the notification sound signal by their push-pull outputs and configured to output the amplified notification sound signal to the sounding body so that the sounding body emits a notification sound for notification of an approach of a vehicle. The vehicle approach notification device further includes a voltage output unit configured to output a voltage between a first common connection terminal and a ground, the first common connection terminal being between the first push-pull circuit and the sounding body, a first resistive element between the voltage output unit and the first common connection terminal, a second resistive element between a second common connection terminal and a ground, the second common connection terminal being between the second push-pull circuit and the sounding body, and a failure determination unit configured to determine whether there is a wire-discontinuity failure in the sounding body by determining whether a voltage between the first common connection terminal and the second common connection terminal is equal to or higher than a predetermined value when the voltage output unit outputs a voltage between the first common connection terminal and the ground while both the push-pull output of the first push-pull circuit and the push-pull output of the second push-pull circuit are stopped.

Accordingly, it is possible to determine whether there is a wire-discontinuity failure in the sounding body by the failure determination unit. Thus, a wire-discontinuity failure of the sounding body can be detected in the vehicle approach notification device provided with the BTL circuit amplifier that includes the sounding body disposed between the first push-pull circuit and the second push-pull circuit.

Further, the vehicle approach notification device may include a control section configured to control the first push-pull circuit and the second push-pull circuit when the push-pull outputs of the first push-pull circuit and the second push-pull circuit are stopped. The first push-pull circuit is controlled by the control section to disconnect the first common connection terminal from the power source and to disconnect the first common connection terminal from the ground. The second push-pull circuit is controlled by the control section to disconnect the second common connection terminal from the power source and to disconnect the second common connection terminal from the ground.

Thus, when the voltage output unit outputs a voltage between the first common connection terminal and ground, it is possible to prevent a decrease in the voltage between the first common connection terminal and the ground and prevent a decrease in the voltage between the second common connection terminal and the ground. Thus, it is possible to stably determine whether the potential difference between the first common connection terminal and the second common connection terminal is equal to or higher than the predetermined value.

BRIEF DESCRIPTION OF THE DRAWINGS

FIG. 3 is a timing chart for describing an operation of the microcomputer when there is no wire-discontinuity failure in a speaker of FIG. 1.

FIG. 4 is a timing chart for describing an operation of the microcomputer when there is a wire-discontinuity failure in the speaker of FIG. 1.

DESCRIPTION OF EMBODIMENTS

Hereinbelow, an embodiment of a vehicle approach notification system 1 of the present disclosure will be described with reference to FIG. 1.

The vehicle approach notification system 1 of the present embodiment is applied to, for example, a hybrid vehicle provided with a traveling motor and a traveling engine.

Figure 1:
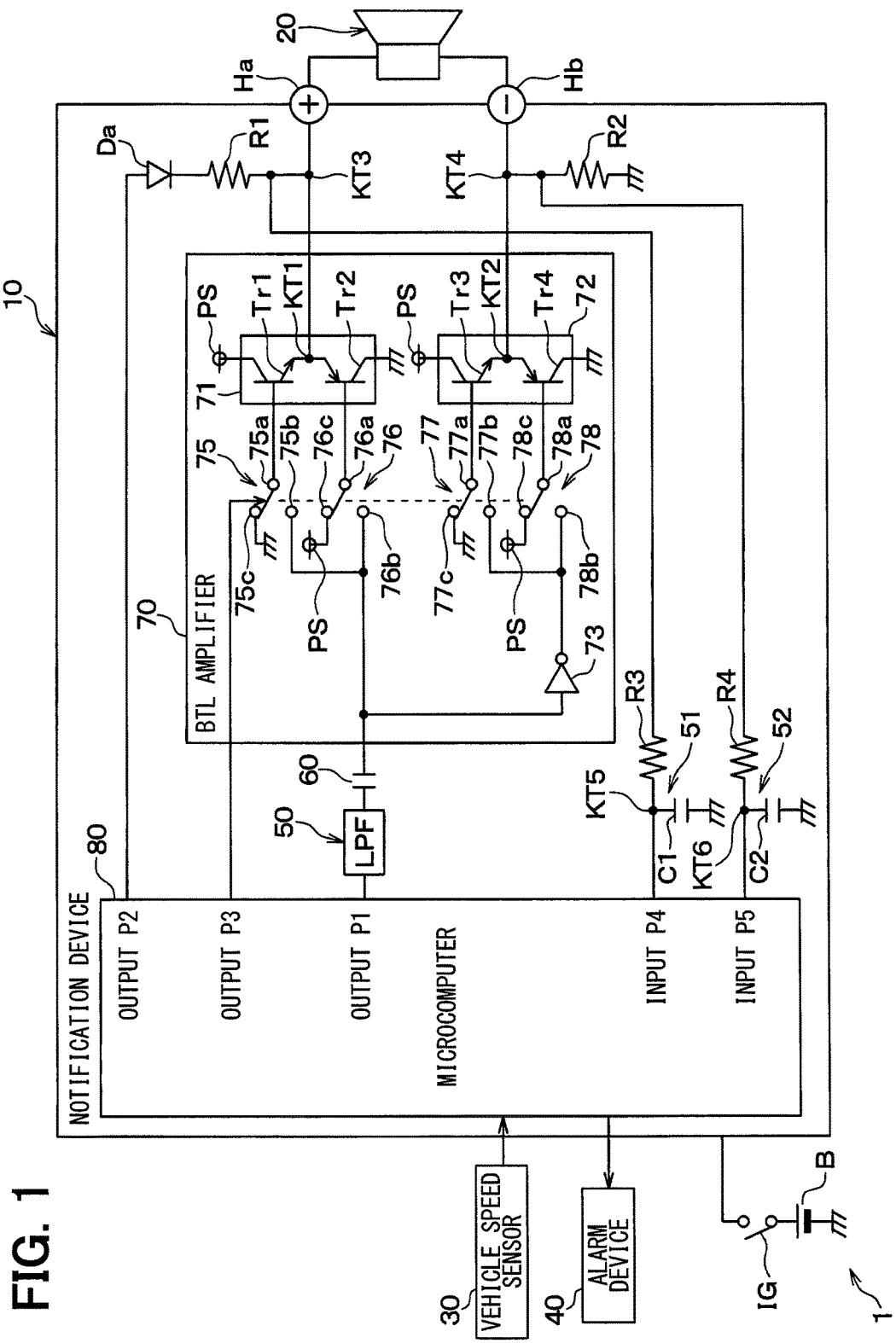
FIG. 1 is a diagram illustrating the configuration of a vehicle approach notification system in an embodiment of the present disclosure.

As illustrated in FIG. 1, the vehicle approach notification system 1 includes a vehicle approach notification device 10, a speaker 20, a vehicle speed sensor 30, and an alarm device 40.

The vehicle approach notification device 10 includes low-pass filters 50, 51, 52, a capacitor 60, a BTL amplifier 70, a resistive elements R1, R2, a diode Da, and a microcomputer 80.

The low-pass filter 50 is a filter through which only a low frequency component of an audio signal output from an audio signal output port P1 of the microcomputer 80 passes.

The audio signal indicates a notification sound for notifying a person near a vehicle of an approach of the vehicle. A pulse width modulation (PWM) signal or an analog signal is used as the audio signal of the present embodiment.

The capacitor 60 removes a direct-current component from an output signal output from the low-pass filter 50 and causes only an alternating-current component to pass.

The BTL amplifier 70 constitutes a power amplifier of BTL circuit form and includes push-pull circuits 71, 72, a phase inversion circuit 73, and switches 75, 76, 77, 78.

The push-pull circuit 71 (first push-pull circuit) includes transistors Tr1, Tr2. The transistors Tr1, Tr2 are turned on and off in accordance with an audio output signal received from the microcomputer 80 through the low-pass filter 50 and the capacitor 60.

The transistors Tr1, Tr2 are connected in series between a direct-current power source PS and ground. The transistor Tr1 is disposed between the transistor Tr2 and the direct-current power source PS.

A common connection terminal KT1 located between the transistors Tr1, Tr2 is connected to a positive electrode of the speaker 20 through a positive terminal Ha. The positive terminal Ha is an electrode that is disposed on the vehicle approach notification device 10.

The push-pull circuit 72 (second push-pull circuit) includes transistors Tr3, Tr4. The transistors Tr3, Tr4 are turned on and off in accordance with an output signal of the phase inversion circuit 73. The transistors Tr3, Tr4 are connected in series between a direct-current power source PS and ground. The transistor Tr3 is disposed between the transistor Tr4 and the direct-current power source PS. The phase inversion circuit 73 is a NOT circuit that inverts the phase of an audio output signal received from the microcomputer 80 through the low-pass filter 50 and the capacitor 60.

A common connection terminal KT2 located between the transistors Tr3, Tr4 is connected to a negative electrode of the speaker 20 through a negative terminal Hb. The negative terminal Hb is an electrode that is disposed on the vehicle approach notification device 10 together with the positive terminal Ha and connected to the speaker 20.

In FIG. 1, a symbol for a bipolar transistor is written as each of the transistors Tr1, Tr2, Tr3, Tr4 for convenience of description. However, the transistors Tr1, Tr2, Tr3, Tr4 are not limited to bipolar transistors.

Various semiconductor switching elements such as a bipolar transistor, a field-effect transistor, an insulated gate bipolar transistor may be used as the transistors Tr1, Tr2, Tr3, Tr4 of the present embodiment.

The switch 75 includes a movable terminal 75a and fixed terminals 75b, 75c. The movable terminal 75a is connected to one of the fixed terminals 75b, 75c. The switch 76 includes a movable terminal 76a and fixed terminals 76b, 76c. The movable terminal 76a is connected to one of the fixed terminals 76b, 76c.

The movable terminal 75a is connected to a base terminal of the transistor Tr1. The movable terminal 76a is connected to a base terminal of the transistor Tr2. The fixed terminal 75c is connected to ground. The fixed terminal 76c is connected to a direct-current power source PS. The fixed terminals 75b, 76b are connected to the capacitor 60.

The switch 77 includes a movable terminal 77a and fixed terminals 77b, 77c. The movable terminal 77a is connected to one of the fixed terminals 77b, 77c. The switch 78 includes a movable terminal 78a and fixed terminals 78b, 78c. The movable terminal 78a is connected to one of the fixed terminals 78b, 78c.

The movable terminal 77a is connected to a base terminal of the transistor Tr3. The movable terminal 78a is connected to a base terminal of the transistor Tr4. The fixed terminal 77c is connected to ground. The fixed terminal 78c is connected to a direct-current power source PS. The fixed terminals 77b, 78b are connected to an output terminal of the phase inversion circuit 73.

In FIG. 1, a symbol for a relay switch is written as each of the switches 75, 76, 77, 78 for convenience of description. However, the switches 75, 76, 77, 78 are not limited to relay switches.

Various semiconductor switching elements such as a bipolar transistor, a field-effect transistor, an insulated gate bipolar transistor may be used instead of the relay switch of the present embodiment.

The resistive element R1 is connected between a common connection terminal KT3 and a speaker wire-discontinuity determination output port P2 of the microcomputer 80. The diode Da is connected between the resistive element R1 and the speaker wire-discontinuity determination output port P2. The common connection terminal KT3 is a first common connection terminal located between the common connection terminal KT1 and the speaker 20. In other words, the common connection terminal KT3 is the first common connection terminal located between the push-pull circuit 71 and the sounding body 20.

An anode terminal of the diode Da of the present embodiment is connected to the speaker wire-discontinuity determination output port P2. A cathode terminal of the diode Da is connected to the resistive element R1. The diode Da is an example of a current limiting element that is disposed between the microcomputer 80 and the first common connection terminal KT3 and prevents a current based on an amplified notification sound signal from flowing to the microcomputer 80 from the first common connection terminal KT3 when each of the first push-pull circuit 71 and the second push-pull circuit 72 performs a push-pull output.

The resistive element R2 is connected between a common connection terminal KT4 and ground. The common connection terminal KT4 is a second common connection terminal located between the common connection terminal KT2 and the speaker 20. In other words, the common connection terminal KT4 is the second common connection terminal located between the push-pull circuit 72 and the sounding body 20.

In the present embodiment, a large value is set as a resistance value of each of the resistive elements R1, R2 in order to prevent output of an audible noise from the speaker 20 caused by energization of the speaker 20 when the microcomputer 80 outputs a high-level signal between the common connection terminal KT3 and the ground. The microcomputer 80 is an example of a voltage output unit that outputs a voltage between the first common connection terminal KT3, which is located between the first push-pull circuit 71 and the sounding body 20, and the ground.

The low-pass filter 51 is connected between the common connection terminal KT3 and an A/D input port P4 of the microcomputer 80. The low-pass filter 51 causes a low frequency component of an output signal output from the common connection terminal KT3 to the ND input port P4 to pass. The common connection terminal KT3 is located between the common connection terminal KT1 and the speaker 20.

Specifically, the low-pass filter 51 includes a resistive element R3 and a capacitor C1. The resistive element R3 is disposed between the common connection terminal KT3 and the ND input port P4 of the microcomputer 80. The capacitor C1 is connected between a common connection terminal KT5, which is located between the resistive element R3 and the A/D input port P4, and the ground. Accordingly, when the microcomputer 80 detects a voltage between the common connection terminal KT3 and the ground, noise resistance can be imparted.

In the present embodiment, the resistive element R3 is set for protecting the ND input port P4 of the microcomputer 80.

The low-pass filter 52 is connected between the common connection terminal KT4 and an A/D input port P5 of the microcomputer 80. The low-pass filter 52 causes a low frequency component of an output signal output from the common connection terminal KT4 to the A/D input port P5 to pass.

Specifically, the low-pass filter 52 includes a resistive element R4 and a capacitor C2. The resistive element R4 is disposed between the common connection terminal KT4 and the ND input port P5 of the microcomputer 80. The capacitor C2 is connected between a common connection terminal KT6, which is located between the resistive element R4 and the A/D input port P5, and the ground. Accordingly, when the microcomputer 80 detects a voltage between the common connection terminal KT4 and the ground, noise resistance can be imparted.

In the present embodiment, the resistive element R4 is set for protecting the ND input port P5 of the microcomputer 80.

The microcomputer 80 includes a memory and a CPU. The microcomputer 80 executes a vehicle approach notification/wire-discontinuity detecting process in accordance with a computer program previously stored in the memory. The vehicle approach notification/wire-discontinuity detecting process includes a vehicle approach process for giving a notification of an approach of the vehicle and a wire-discontinuity detecting process for detecting a wire discontinuity in the speaker 20.

When the microcomputer 80 executes the vehicle approach process, the microcomputer 80 causes the speaker 20 to emit a notification sound in a period between when the vehicle starts traveling by being driven by the traveling motor and when a speed of the vehicle reaches an upper limit speed in accordance with a detection signal of the vehicle speed sensor 30 and a control signal from a hybrid ECU A pedestrian is assumed to notice an approach of the vehicle traveling at the upper limit speed of the present embodiment by a noise generated with the traveling of the vehicle. The upper limit speed is set to, for example, 25 km/h. The vehicle speed sensor 30 detects the speed of the vehicle. The speaker 20 is a sounding body that is mounted outside a cabin of the vehicle and outputs a notification sound to the surroundings of the vehicle. A traveling driving source signal from the hybrid ECU includes information that indicates which one of the traveling motor and the traveling engine is used as the traveling driving source.

When the microcomputer 80 executes the wire-discontinuity detecting process, the microcomputer 80 determines whether there is a wire-discontinuity failure in the speaker 20 on the basis of an output signal of an ignition switch IG and a detection signal of the vehicle speed sensor 30. When the microcomputer 80 determines that there is a wire-discontinuity failure in the speaker 20, the microcomputer 80 issues an alarm to an occupant through the alarm device 40.

The alarm device 40 of the present embodiment includes an indicator that is disposed within an instrument panel and displays an alarm display or an alarm sound generator that generates an alarm sound.

Hereinbelow, the vehicle approach notification/wire-discontinuity detecting process of the present embodiment will be described.

Figure 2:
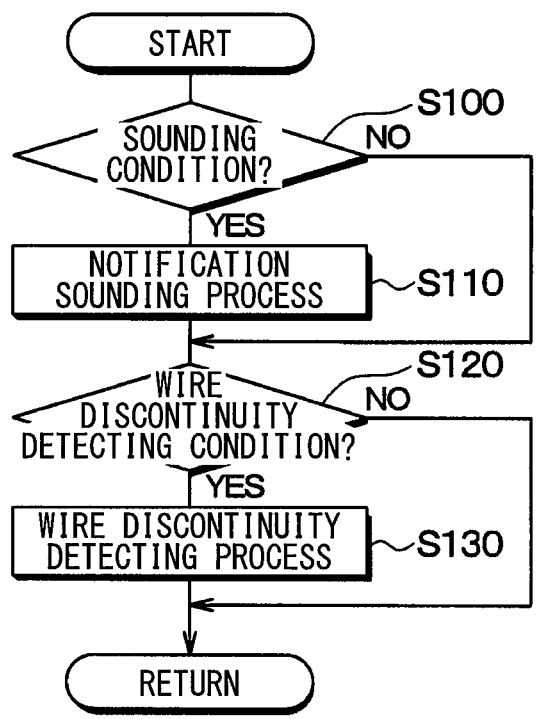
FIG. 2 is a flowchart illustrating a vehicle approach notification/wire-discontinuity detecting process of a microcomputer of FIG. 1.

The microcomputer 80 executes the vehicle approach notification/wire-discontinuity detecting process in accordance with a flowchart of FIG. 2.

First, it is determined whether a condition for causing the speaker 20 to emit a notification sound (hereinbelow, referred to as a notification sounding condition) is satisfied (step 100).

For example, it is determined whether the vehicle travels by being driven by the traveling motor and the vehicle speed is lower than the upper limit speed on the basis of a detection signal of the vehicle speed sensor 30 and a traveling driving source signal from the hybrid ECU.

When the vehicle travels by being driven by the traveling engine, it is determined that the notification sounding condition is not satisfied, that is, NO is determined in step 100.

When the vehicle travels by being driven by the traveling motor, and the vehicle speed is equal to or higher than the upper limit speed, it is determined that the notification sounding condition is not satisfied, that is, NO is determined in step 100.

When the vehicle is in a stopped state, it is determined that the notification sounding condition is not satisfied, that is, NO is determined in step 100.

When the vehicle travels by being driven by the traveling motor, and the vehicle speed is lower than the upper limit speed, it is determined that the notification sounding condition is satisfied, that is, YES is determined in step 100.

In this manner, it is determined whether the notification sounding condition is satisfied on the basis of a detection signal of the vehicle speed sensor 30 and a traveling driving source signal from the hybrid ECU.

For example, when it is determined that the notification sounding condition is satisfied, that is, YES is determined in step 100, the process proceeds to the next step 110, and the notification sounding process is executed.

When it is determined that the notification sounding condition is not satisfied, that is, NO is determined in step 100, the process proceeds to step 120. After the execution of the notification sounding process (step 110), the process proceeds to step 120.

In step 120, it is determined whether a condition for detecting a wire discontinuity (hereinbelow, referred to as a wire-discontinuity detecting condition) is satisfied.

For example, it is determined whether the current time is a timing within a predetermined time after the ignition switch IG is turned on. The predetermined time is a period during which the vehicle is assumed to be in a stopped state after the ignition switch IG is turned on.

Thus, when the current time is the timing within the predetermined time after the ignition switch IG is turned on, it is determined that the wire-discontinuity detecting condition is satisfied, that is, YES is determined in step 120. In other words, when the current time is a timing immediately after the ignition switch IG is turned on, it is determined that the wire-discontinuity detecting condition is satisfied, that is, YES is determined in step 120. Accordingly, the wire-discontinuity detecting process (step 130) is executed, and the process then returns to step 100.

On the other hand, when the current time is a timing after the elapse of the predetermined time after the ignition switch IG is turned on, it is determined that the wire-discontinuity detecting condition is not satisfied, that is, NO is determined in step 120. Also in this case, the process returns to step 100.

Each of the processes of steps 100, 110, 120, 130 as described above is repeatedly performed.

Hereinbelow, the notification sounding process of the present embodiment will be described prior to the wire-discontinuity detecting process. (Notification Sounding Process)

The microcomputer 80 outputs a low-level signal through the speaker wire-discontinuity determination output port P2.

In addition, the microcomputer 80 outputs a high-level signal to the switches 75, 76, 77, 78 through an amplifier ON/OFF control output port P3.

Thus, the movable terminal 75a of the switch 75 is connected to the fixed terminal 75b, and the movable terminal 76a of the switch 76 is connected to the fixed terminal 76b. Thus, the base terminals of the transistors Tr1, Tr2 are connected to the capacitor 60.

The movable terminal 77a of the switch 77 is connected to the fixed terminal 77b, and the movable terminal 78a of the switch 78 is connected to the fixed terminal 78b. Thus, the base terminals of the transistors Tr3, Tr4 are connected to the output terminal of the phase inversion circuit 73.

The microcomputer 80 outputs an audio signal to the low-pass filter 50 through the audio signal output port P1. The low-pass filter 50 outputs a low frequency signal component, which is a signal component having a frequency less than a predetermined frequency, of the audio signal from the audio signal output port P1 as an output signal.

The capacitor 60 removes a direct-current component from the output signal of the low-pass filter 50 and outputs only an alternating-current component of the output signal to the base terminals of the transistors Tr1, Tr2 of the push-pull circuit 71 and the phase inversion circuit 73.

The phase inversion circuit 73 inverts the phase of the output signal of the low-pass filter 50 that has passed through the capacitor 60 and outputs the inverted output signal to the base terminals of the transistors Tr3, Tr4 of the push-pull circuit 72.

Thus, each of the push-pull circuits 71, 72 performs a push-pull output by the supply of a direct-current power from the direct-current power source PS.

At this time, a first state in which the transistors Tr1, Tr4 are on and the transistors Tr2, Tr3 are off and a second state in which the transistors Tr1, Tr4 are off and the transistors Tr2, Tr3 are on are alternately performed.

In the first state, a current from the direct-current power source PS flows to the transistor Tr1, the speaker 20, the transistor Tr4, and the ground in this order. In the second state, a current from the direct-current power source PS flows to the transistor Tr3, the speaker 20, the transistor Tr2, and the ground in this order.

The audio signal from the audio signal output port P1 of the microcomputer 80 is power-amplified and supplied to the speaker 20 by the push-pull output of each of the push-pull circuits 71, 72. Thus, the speaker 20 emits a notification sound.

(Wire-Discontinuity Detecting Process)

The microcomputer 80 outputs a low-level signal to the switches 75, 76, 77, 78 through the amplifier ON/OFF control output port P3 (refer to (a) of FIG. 3 and (a) of FIG. 4).

Thus, the movable terminal 75a of the switch 75 is connected to the fixed terminal 75c, and the movable terminal 76a of the switch 76 is connected to the fixed terminal 76c. Thus, the base terminal of the transistor Tr1 is connected to the ground, and the base terminal of the transistor Tr2 is connected to the direct-current power source PS. Accordingly, the transistors Tr1, Tr2 are turned off.

Accordingly, the push-pull circuit 71 disconnects the common connection terminal KT3 (or KT1) and the direct-current power source PS from each other and disconnects the common connection terminal KT3 (or KT1) and the ground from each other.

Further, the movable terminal 77a of the switch 77 is connected to the fixed terminal 77c, and the movable terminal 78a of the switch 78 is connected to the fixed terminal 78c. Thus, the base terminal of the transistor Tr3 is connected to the ground, and the base terminal of the transistor Tr4 is connected to the direct-current power source PS. Accordingly, the transistors Tr3, Tr4 are turned off.

Accordingly, the push-pull circuit 72 disconnects the common connection terminal KT4 (or KT2) and the direct-current power source PS from each other and disconnects the common connection terminal KT4 (or KT2) and the ground from each other.

Further, the microcomputer 80 outputs a high-level signal between the common connection terminal KT3 and the ground from the speaker wire-discontinuity determination output port P2 through the diode Da and the resistive element R1 (refer to (b) of FIG. 3 and (b) of FIG. 4).

At this time, when there is no discontinuity in a wiring line (that is, a current path) between the positive terminal Ha and the negative terminal Hb, current flows from the speaker wire-discontinuity determination output port P2 to the ground through the diode Da, the resistive element R1, the speaker 20, and the resistive element R2.

Accordingly, a voltage between the common connection terminal KT3 and the ground increases. Thus, a voltage V1 (refer to (c) of FIG. 3) which is applied from the common connection terminal KT3 to the A/D input port P4 of the microcomputer 80 increases.

Further, a voltage between the common connection terminal KT4 and the ground increases. A voltage V2 (refer to (d) of FIG. 3) which is applied from the common connection terminal KT4 to the A/D input port P5 of the microcomputer 80 increases.

When there is no discontinuity in the wiring line (that is, the current path) between the positive terminal Ha and the negative terminal Hb, an impedance between the positive terminal Ha and the negative terminal Hb through the speaker 20 is extremely small. Thus, a difference $\Delta V$ (=V1−V2) between the voltage V1 and the voltage V2 is extremely small ($\Delta V \approx 0$: refer to (e) of FIG. 3). Thus, when the difference $\Delta V$ (=V1−V2) is equal to or less than a threshold V3, it is determined that there is no disconnection in the speaker 20, and the speaker 20 is normal. The threshold V3 is a determination value for determining the presence or absence of a wire discontinuity in the speaker 20.

On the other hand, when there is a wire discontinuity in the wiring line (that is, the current path) between the positive terminal Ha and the negative terminal Hb, the impedance between the positive terminal Ha and the negative terminal Hb through the speaker 20 is extremely large. Thus, an extremely small current flows from the speaker wire-discontinuity determination output port P2 to the ground through the diode Da, the resistive element R1, the speaker 20, and the resistive element R2.

Thus, although the voltage between the common connection terminal KT3 and the ground increases with the output of a high-level signal between the common connection terminal KT3 and the ground by the microcomputer 80, a degree of increase in the voltage between the common connection terminal KT4 and the ground is small. Thus, the voltage V2 becomes lower than the voltage V1. Accordingly, the difference $\Delta V$ (=V1−V2) between the voltage V1 and the voltage V2 increases ($\Delta V > V3$: refer to (c), (d), and (e) of FIG. 4).

Thus, in the present embodiment, the microcomputer 80 detects the voltages V1, V2 n (>2) times at intervals of fixed time t2 after the elapse of a stabilization period t1 after the microcomputer 80 outputs the high-level signal between the common connection terminal KT3 and the ground.

The stabilization period t1 is a time that is required for stabilizing the voltage between the common connection terminal KT5 and the ground and the voltage between the common connection terminal KT6 and the ground after the microcomputer 80 outputs the high-level signal between the common connection terminal KT3 and the ground.

The microcomputer 80 determines whether the difference $\Delta V$ (=V1−V2) is equal to or more than the threshold V3 n times, and determines whether there is a wire-discontinuity failure in the speaker 20 on the basis of results of the n-times determinations.

For example, when the number of times Na the difference $\Delta V$ is determined to be equal to or more than the threshold V3 is m times or more (Na≥m) in the n-times determinations, it is determined that there is a wire-discontinuity failure in the speaker 20, and the speaker 20 is abnormal.

On the other hand, when the number of times Na the difference $\Delta V$ is determined to be equal to or more than the threshold V3 is less than m times (Na<m) in the n-times determinations, it is determined that there is no wire-discontinuity failure in the speaker 20, and the speaker 20 is normal. Here, n and m are integers that satisfy n≥m.

When it is determined that there is a wire discontinuity in the speaker 20 on the basis of the n-times determinations as described above, the alarm device 40 issues an alarm to the driver or the like. Accordingly, the driver is notified that there is a wire discontinuity in the speaker 20, and sounding is impossible.

According to the present embodiment described above, the vehicle approach notification device 10 includes the push-pull circuit 71 which performs a push-pull output based on a notification sound signal, and the push-pull circuit 72 which performs a push-pull output based on the notification sound signal whose phase is inverted by the phase inversion circuit 73. The push-pull circuits 71 and 72 amplify the power of the notification sound signal by the push-pull outputs and output the amplified signal to the speaker 20 so that the speaker 20 emits a notification sound to give a notification of an approach of the vehicle.

The vehicle approach notification device 10 includes the resistive element R1 which is connected between the speaker wire-discontinuity determination output port P2 of the microcomputer 80 and the common connection terminal KT3, and the resistive element R2 which is connected between the common connection terminal KT4 and the ground.

When the push-pull output of each of the push-pull circuits 71, 72 is stopped, and the microcomputer 80 outputs a high-level signal between the common connection terminal KT3 and the ground through the speaker wire-discontinuity determination output port P2, the microcomputer 80 determines whether there is a wire-discontinuity failure in the speaker 20 by determining whether a potential difference between the common connection terminals KT3, KT4 is equal to or higher than a predetermined value.

Accordingly, it is possible to determine whether there is a wire-discontinuity failure in the speaker 20 in the vehicle approach notification device 1 which constitutes a BTL circuit power amplifier in which the speaker 20 is disposed between the push-pull circuits 71, 72.

In the present embodiment, when the microcomputer 80 outputs a high-level signal between the common connection terminal KT3 and the ground, the microcomputer 80 turns off the transistors Tr1, Tr2, Tr3, Tr4. Thus, it is possible to prevent an increase or decrease in the voltage between the common connection terminal KT3 and the ground and prevent an increase or decrease in the voltage between the common connection terminal KT4 and the ground.

Accordingly, it is possible to stably perform a wire-discontinuity failure determination within a short time during the stop of sounding control in which the push-pull output of each of the push-pull circuits 71, 72 is stopped and to notify the driver or the like of impossibility of sounding of the vehicle approach notification system 1 early.

In the above embodiment, the vehicle approach notification system 1 is applied to the hybrid vehicle provided with the traveling motor and the traveling engine. However, the present disclosure is not limited thereto, and the vehicle approach notification system 1 may be applied to an electric vehicle provided with only a traveling motor.

In the above embodiment, it is determined whether the difference $\Delta V$ is less than the threshold V3 n times, and it is determined whether there is a wire-discontinuity failure in the speaker 20 on the basis of results of the n-times determinations. Alternatively, it may be determined whether the difference $\Delta V$ is less than the threshold V3 once, and it may be determined whether there is a wire-discontinuity failure in the speaker 20 on the basis of a result of the one determination.

The present disclosure is not limited to the embodiments described above and can be modified in an appropriate manner. The above embodiments are not unrelated to each other and can be combined with each other in an appropriate manner unless the combination is clearly impossible. In each of the above embodiments, it is needless to say that the elements constituting the embodiment are not necessarily indispensable unless the elements are specifically stated as indispensable or the elements are regarded as obviously indispensable in principle. When a specific value such as the number of elements, a value, an amount, or a range is mentioned in each of the above embodiments, it should be understood that the present disclosure is not limited to the mentioned specific value unless the specific value is specifically stated as indispensable or the present disclosure is obviously limited to the specific value in principle. When the shape of an element or the positional relationship between elements is mentioned in each of the above embodiments, it should be understood that the present disclosure is not limited to the mentioned shape or positional relationship unless specifically stated or the present disclosure is limited to the specific shape or positional relationship in principle.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A vehicle approach notification device comprising:
a first push-pull circuit configured to perform a push-pull output based on a notification sound signal;
a phase inversion circuit configured to invert a phase of the notification sound signal; and
a second push-pull circuit configured to perform a push-pull output based on the notification sound signal whose phase has been inverted by the phase inversion circuit,
wherein:
the first push-pull circuit and the second push-pull circuit constitute a BTL circuit amplifier that includes a sounding body disposed between the first push-pull circuit and the second push-pull circuit; and
the first push-pull circuit and the second push-pull circuit are configured to amplify a power of the notification sound signal by their push-pull outputs and configured to output the amplified notification sound signal to the sounding body so that the sounding body emits a notification sound for notification of an approach of a vehicle,
the vehicle approach notification device further comprising:
a microcomputer connected to a first common connection terminal without connection through the BTL circuit and configured to output a voltage between the first common connection terminal and a ground, the first common connection terminal being between the first push-pull circuit and the sounding body;
a first resistive element between the microcomputer and the first common connection terminal;
a second resistive element between a second common connection terminal and the ground, the second common connection terminal being between the second push-pull circuit and the sounding body; and
a failure determination unit configured to determine whether there is a wire-discontinuity failure in the sounding body by determining whether a voltage between the first common connection terminal and the second common connection terminal is equal to or higher than a predetermined value when the microcomputer outputs a voltage between the first common connection terminal and the ground while both the push-pull output of the first push-pull circuit and the push-pull output of the second push-pull circuit are stopped.

2. The vehicle approach notification device according to claim 1, wherein:
the first push-pull circuit is between a power source and the ground and configured to perform the push-pull output based on a direct-current power output from the power source;
the second push-pull circuit is between the power source and the ground and configured to perform the push-pull output based on a direct-current power output from the power source; and
the vehicle approach notification device further comprises a control section configured to control the first push-pull circuit and the second push-pull circuit when the push-pull outputs of the first push-pull circuit and the second push-pull circuit are stopped, wherein the first push-pull circuit is controlled by the control section to disconnect the first common connection terminal from the power source and to disconnect the first common connection terminal from the ground, and the second push-pull circuit is controlled by the control section to disconnect the second common connection terminal from the power source and to disconnect the second common connection terminal from the ground.

3. The vehicle approach notification device according to claim 1, further comprising
a current limiting element disposed between the microcomputer and the first common connection terminal and configured to prevent a current caused by the amplified notification sound signal from flowing from the first common connection terminal to the microcomputer during the push-pull outputs of the first push-pull circuit and the second push-pull circuit, wherein
the microcomputer is configured to output the voltage between the first common connection terminal and the ground through the current limiting element.

* * * * *